3,079,368
PROCESS FOR THE PREPARATION OF HIGH MOLECULAR WEIGHT POLYMERIZABLE ORTHOPHTHALATE POLYESTERS
Lennart A. Lundberg, Stamford, Conn., assignor to American Cyanamid Company, Stamford, Conn., a corporation of Maine
No Drawing. Filed Nov. 23, 1959, Ser. No. 854,608
19 Claims. (Cl. 260—75)

This invention relates generally to essentially linear, ethylenically unsaturated polyester resins of the variety commonly utilized in conjunction with monomeric cross-linking agents copolymerizable therewith to produce thermosetting polyester resinous compositions. More particularly, this invention relates to a novel process for preparing improved, ethylenically unsaturated polyester resins from an esterifiable reaction mixture comprising an alpha, beta-ethylenically unsaturated dicarboxylic acid, ortho-phthalic acid or the anhydride thereof, and a saturated aliphatic polyol. Still more specifically, the present invention concerns a process for preparing improved high molecular weight polyester resins which includes the method steps of initially esterifying at elevated temperatures the resin-forming components as aforesaid until a substantially maximum softening point is obtained for the esterification product and thereupon further heating the polyester product in the presence of a basic transesterification catalyst.

The polyester resinous compositions to which the practice of this invention has particular applicability are well known in the art. They comprise physical admixtures of a reactive unsaturated linear resin or polyester resin, usually obtained by condensing an alpha, beta-ethylenically unsaturated polycarboxylic acid and a polyol, the latter generally a glycol, and an ethylenically unsaturated monomeric compound capable of copolymerizing with said reactive unsaturated resin under applicable curing conditions. Polyester resinous compositions are at present extensively used to produce various types of plastic products. Some of the special fields of application wherein the cured (thermoset) products derived from these compositions are advantageously employed include such as laminating, adhesives and surface coatings. Additionally they are utilized in the preparation of filled or unfilled castings. Perhaps the laminating art among those specifically listed accounts for the use of the bulk of the polyester resinous compositions produced.

Polyester resinous compositions represent an excellent resinous binder in the preparation of, for instance, glass fiber filled laminates. Such products are characterized by having excellent chemical resistance and especially by the excellent mechanical strength characteristics they exhibit. Basically, conventional polyester resinous compositions are as indicated an admixture of a resinous unsaturated polyester and a copolymerizable non-resinous cross-linking agent; however, in the present state of the art considerable variations, for one reason or another, will be found in the reactive resin component in itself. Thus, in any particular type of end use application and even within a given field a special reactive resin formulation will be favored.

This present invention pertains to a special type or class of reactive resins which are extensively employed in the production of polyester resinous compositions designed for the preparation of glass-fiber filled laminates. More specifically, this invention is directed to the preparation of said reactive resins wherein part of the dicarboxylic acid employed in preparing the reactive resin is ortho-phthalic.

Substitution of part of the dicarboxylic acid content of a reactive resin formulation with a non-polymerizable diacid such as o-phthalic acid is commonly observed because such a practice imparts certain desirable properties to the reactive resin which in turn show up in the final product, that is, the copolymer of the reactive resin and the monomeric cross-linking agent achieved in the curing of the composition. Notable among the unique features imparted by the use of ortho-phthalic acid in this manner is the combination of desirable flexibility and relatively high heat distortion characteristics exhibited by the cured polyester resin compositions. Additionally, ortho-phthalic acid is more available and less expensive than the majority of the suitable non-polymerizable dicarboxylic acids that may be used in the preparation of the reactive resins.

There is a disadvantage, however, residing in the use of ortho-phthalic acid in preparing the reactive resins of the type herein concerned. Unfortunately, ortho-phthalic acid does not permit the realization of the high molecular weight usually associated with reactive resins or polyesters when these resins are prepared solely from $\alpha,\beta$-ethylenically unsaturated acids or combinations of said unsaturated variety and certain other non-polymerizable acids. High molecular weight polyesters are desirable because there is a definite relationship between this molecular weight property and the mechanical strength characteristics exhibited by the cured polyester resinous composition.

It is known in the art that the molecular weight to be achieved by employing a significant portion of the dicarboxylic acid content as phthalic acid is adversely limited by the inherent nature of the phthalic acid as an esterifiable component. Esterification products derived from ortho-phthalic acid, particularly the linear variety with which this invention is concerned, exhibit comparatively low molecular weights. In other words, continued heating of linear resin forming mixtures of this type will not result in an indefinite build-up of molecular weight. Usually there is a point attained in the esterification reaction in which the average molecular weight reaches a substantially maximum value. This phenomenon is attributed to the chemical structure of ortho-phthalic acid, which may be verbally depicted as a benzenoid nucleus containing two adjacent carboxyl substituents. It is accordingly believed that this orientation of the functional groups not only results in a form of steric hinderance but also that there is force or strain existing once these groups have esterified which strain influences their partial de-esterification. Consequently it is thought that when the average molecular weight of the esterification mixture reaches a substantially constant value, the situation is one where the esterification and de-esterification occurring essentially balance out with the net result that the average molecular weight remains more or less constant.

Prior to this invention, when conducting an esterification process involving the use of ortho-phthalic acid to prepare the instant linear type resins, there existed no real choice but to accept the product as the best obtainable under the circumstances when once the esterification rate and the de-esterification rate began to equalize.

Ordinarily, the decrease in acid number value in the usual reaction system is indicative, more or less, of the progress in achieving higher molecular weights. Only to a point is this true in an esterification reaction process involving the use of ortho-phthalic acid to prepare linear resins. I have carefully checked this aspect and have found that resinifiable compositions to which this invention is directed can develop their maximum molecular weight, that is, maximum average molecular weight, in the acid number range of from about 20 to 50. It is true that further heating can be accomplished by employing certain safeguards which prevent side reactions, e.g., the coreaction of the individual resin molecules with each other through their ethylenic unsaturation sites. Accordingly, continued heating will result in progressively lower acid numbers, and as a matter of fact acid values down as low as 10 or even 5 or less may be obtained. Nevertheless, the increase of average molecular weight experienced from the drop of acid number in the range of from about 20 to 30 down to the lower indicated acid number is ordinarily negligible.

In accordance with this invention, the reactive resins partially based on ortho-phthalic acid, can be converted into relatively high molecular weight compositions. My process involves first heating in a conventional manner an esterifiable reaction mixture of the type herein concerned containing ortho-phthalic acid as a significant portion of the dicarboxylic acid content until the point where the average molecular weight approaches a substantially maximum value. At this point I have found that if there is introduced into the reaction mixture a basic transesterification catalyst the mixture may be processed to very low acid numbers and at the same time there is a substantial build-up of polymeric weight. To illustrate; a given polyester formulation which will normally progress to a molecular weight of about 2000 to 4000, will when subjected to the novel procedure which I have discovered eventually result in the polyester having a molecular weight of 7000 and even as high as about 11,000 in some instances. Prior to discussing the detailed features of my discovery, a discussion of the specific nature and makeup of reactive resin formulation having applicability in the practice of the instant invention will be set forth.

As indicated previously, reactive resins employed in polyester resinous compositions must contain a degree of polymerizable or ethylenic saturation in order that they may copolymerize with ethylenically unsaturated monomeric cross-linking agents. This is commonly achieved by employing an alpha, beta-ethylenically unsaturated dicarboxylic acid, or at least a portion of such an acid, in the preparation of the reactive resin. Suitable among the alpha, beta-ethylenically unsaturated polycarboxylic acids that may be used in this manner are such as maleic, fumaric, aconitic, itaconic, monochlorofumaric, and the like. Seldom are reactive resins formulated wherein the total carboxylic acid content consists of the unsaturated type described. Ordinarily, non-polymerizable acids are used in conjunction with the ethylenically unsaturated dicarboxylic acids. As indicated previously, the polyesters or reactive resins to which this invention is directed are limited to those types wherein ortho-phthalic acid is employed in combination with an alpha, beta-ethylenically unsaturated polycarboxylic acid. The amounts of ortho-phthalic acid that may be employed to prepare reactive resins in accordance with this invention range from about 10% to 90% based on the total polyacid component existing in the esterification mixture. On this basis I prefer to use an ortho-phthalic acid content in the order of from about 25 to 70%.

Of the polyhydric alcohols which may be employed in the preparation of the reactive resin, it is preferred that those containing only two hydroxyl groups be used. Suitable glycols for this purpose include: ethylene glycol, diethylene glycol, propylene glycol, dipropylene glycol, triethylene glycol, tetraethylene glycol, butanediol-1,2; butanediol-1,3; butanediol-1,4; pentanediol-1,2; pentanediol-1,4; pentanediol-1,5; hexanediol-1,6; neopentyl glycol, and the like. Polyhydric alcohols having more than two hydroxyl groups which may be used include such as glycerol, trimethylol ethane, trimethylol propane, pentaerythritol, dipentaerythritol, sorbitol, etc. It is usually desirable that the dihydric alcohol be employed in major proportions relative to any polyols containing more than two hydroxyl groups.

When both the polyhydric alcohol and the dicarboxylic acid employed are esterifiably difunctional in nature, these components are preferably reacted in amounts representing about 10% excess of polyhydric alcohol above the stoichiometric quantity required for a substantially complete esterification of the acid. When a polyhydric alcohol containing more than two hydroxy groups is used, excesses of the alcoholic reactant as high as 25% may be advantageously utilized.

The polymerizable unsaturated polyesters prepared in accordance with this invention are obtained by observing two defined processing steps. In the initial step, the esterifiable mixture formulated generally in accordance with the above are reacted in a conventional manner. The conventional manner referred-to merely consists of reacting the polybasic acid component with the polyhydric alcohol component at elevated temperatures and usually at atmospheric pressure. In this first step the temperature at which the esterification reaction is carried out is not critical. The customary temperature employed is just below the boiling point of the most volatile component of the reaction mixture which is generally the glycol employed. However, temperatures in excess of the boiling point of the glycol constituent may be used if care is utilized in providing the reaction vessel with a steam heated reflux condenser. Accordingly an applicable range of temperatures that may be used in the initial processing step is from about 160–225° C. The end point usually observed in conventional procedures for preparing unsaturated polyesters constitutes the end point of the first stage of my novel process. Ordinarily, the esterification reaction involving the preparation of reaction polyesters is stopped when an acid number in the order of from about 20 to 50 is obtained. I too may use this criterion as indicating when to commence the second step of my process. However, besides this acid number control I have found a more preferable control denoting the completion of the first step of my process to consist of determining the melting point characteristics of the preliminary esterification product. This method is preferred because it is somewhat more reliable in indicating when the average molecular weight of the reaction mixture is approaching a constant value. A suitable device for determining the melting point of the esterification product in accordance with this procedure is a Dennis Melting Point Bar. Such a device is standard in the art and the method involved consists of noting the temperature at which a sample of the resin product sticks to the bar when retained thereon for approximately 10 seconds. I have found that if a polyester resin is formulated in accordance with the practices set forth hereinabove, such resins will reach a substantially maximum softening point when the esterified mixture attains an acid number within the range of from about 20 to 50. The specific melting point that any given composition will exhibit depends on the particular constituent make-up of the formulation involved, that is, the ratio of alpha, beta-ethylenically unsaturated dicarboxylic acid to the ortho-phthalic component, type of unsaturated diacid employed, type and amount of polyhydric alcohols employed, etc.

In accordance with my invention, once the polyester has reached a substantially maximum softening point value, the second phase of my process, which represents the novel and critical portion thereof, is commenced. In this step, there is added to the polyester existing in the reaction sphere a basic transesterification catalyst, and heating resumed employing temperatures in the range of from about 150 to 210° C. and preferably observing vacuum or partial vacuum conditions.

The basic transesterification catalysts, the use of which is essential in the observance of my novel process, constitute an art-recognized class of catalytic agents. Transesterification catalysts are universally employed in the preparation of those polymeric materials commonly designated super polyesters. It is these catalysts, as understood in the aforesaid art, that are advantageously and necessarily employed in the practice of the instant invention.

The foremost physical property characteristic of this class of catalyst is their alkaline reacting nature. In a few instances suitable ester interchange catalysts may be of the type exhibiting neutral characteristics. Like in the art of producing super poly condensation products, I have observed that the acidic catalysts which may to some extent be effective in promoting an ester interchange reaction are not applicable. Presumably like in the super polymer art the acidic catalysts are undesirable for my purposes because of the deleterious side reactions which they induce.

Suitable basic transesterification catalysts include the metals such as lithium, sodium, potassium, calcium, beryllium, magnesium, titanium, zinc, cadmium, aluminum, chrominum, molybdenum, iron, nickel, cobalt, tin, lead, etc. or any salts thereof exhibiting basic characteristics.

With regard to the alkali metals, the alkaline earth metals, magnesium or titanium, it is preferred that such metals be used in the form of alcoholates formed by dissolving said metals in a suitable alcohol. Additionally, the alkali metals may be used in the form of their carbonates or other alkaline reacting salts, for example, borates. Further, magnesium may be used in the form of its oxide.

It is not practical to specifically enumerate here the rather vast number of basic transesterification catalysts which may be used in the practice of my invention. However, besides the specific catalysts shown in the examples set forth hereinbelow, the diverse types of individual metal salts that are applicable can be illustrated by considering the metal calcium. For example, suitable calcium compounds include calcium oxide, calcium peroxide, calcium hydroxide, calcium carbide, calcium cyanamide, calcium salts of inorganic acids such as calcium borate, calcium tungstate, calcium titanate, calcium silicate, and calcium salts of organic acids, such as calcium acetate, calcium hydroxy acetate, calcium octoate, calcium naphthenate and calcium stearate. The amount of basic transesterification catalysts to be employed in order to realize the objects of this invention is relatively small and ranges from about 0.005% to 0.50% based on the weight of the polyester. While the total amount of catalyst that is to be used can be added at the commencing of the second stage of my process, it is sometimes advantageous to employ a portion of this amount, say one half initially, and add the balance during the cycle represented by the second step of my process. The temperature that may be employed in the second step of my process may range from about 150 to 210° C. and differs from the temperatures employed in the initial step mainly in that somewhat lower maximum temperatures are generally applicable. A preferred range of temperatures for this step is from about 180–210° C. Additionally as mentioned it is preferable that the second stage of the instant process be conducted under sub-atmospheric conditions. Vacuum conditions represented by the range of pressures from 100 to 400 mm. may be advantageously observed. Ordinarily, pressures in the order of from about 100 to 200 mm. are preferred primarily because plant facilities are generally more adapted to operate within this range. The period of processing in the second stage of the process of this invention is of sufficient amplitude so as to account for at least about a 10° C. increase in softening point for the polyester over and above that value obtained for the product in the initial step. I have found that a differential in this order signifies a sufficient increase in molecular weight which results in significant improvement in the properties of the polyester resin. This invention, however, is not limited to the aforesaid 10° C. softening point increase, as esterification formulations have by my process been extended 30° C. above the softening point that is ordinarily obtained for the same composition by conventional processing means. The above constitute the essential features involved in the preparation of polyester compositions in accordance with this invention. Many of these details will be amplified in the specific embodiments set forth hereinbelow.

The unsaturated polyesters prepared in accordance with my invention have special utility as the resinous component in polyester resinous compositions. Accordingly, it is apropos to consider more in detail the nature of these compositions. Besides the reactant resin it is necessary to include within each composition a reactive component represented by a class of polymerizable monomers or cross-linking materials. These monomeric materials may be any one of a number of compounds containing a polymerizable $CH_2=C<$ group and desirably having a boiling point above about 60° C. Among the many suitable terminally unsaturated monomers that may be employed are the following: styrene, and alkyl and halo substituted styrene such as alpha methylstyrene, alpha chlorostyrene, alpha ethylstyrene and the like, or alkyl and halo ring-substituted styrenes such as ortho-, meta- and para-alkyl styrenes, e.g., o-methylstyrene, p-ethylstyrene, m-propylstyrene, 2,4-dimethylstyrene, 2,5- diethylstyrene, o-bromostyrene, p-chlorostyrene, 2,4-dichlorostyrene, and the like. Alkyl esters of acrylic and methacrylic acids may also be used as the cross-linking monomeric material. Additionally, aliphatic vinyl esters may be suitably employed such as vinyl stearate, vinyl laurate, vinyl butyrate, vinyl acetate, acrylonitrile, methacrylonitrile, etc. Acrylamide and methacrylamide may also be used to advantage as cross-linking agents for the reactive resin. Still further the various allyl esters may be suitably employed. Examples of the diallyl esters which may be used in this manner include diallyl phthalate, diallyl succinate, diallyl maleate, diallyl fumarate, diallyl adipate, diallyl sebacate, diallyl itaconate, and the like. Triallyl esters may also be used, e.g., triallylcyanurate, triallylisocyanurate, triallyl monochlorocyanurate, etc. Furthermore, monoallyl esters such as allyl methacrylate, and the like may be used. These polymerizable materials containing the $CH_2=C<$ group may be used singly or in combination with one another.

The ratio of the reactive resin to the monomeric cross-linking agent may be varied over a wide range. The unsaturated resin content may, therefore, range from about 10 to about 90 parts to a corresponding 90 to 10 parts of the monomeric material. For most purposes, however, from about 40 to 60 parts of the reactive resin and corresponding from about 60 to 40 parts of the monomeric cross-linking agent preferably constitute a polymerizable polyester resinous composition.

In order to facilitate the copolymerization of the monomeric polymerizable material with the unsaturated polyester it is preferred that an addition type polymerization catalyst be included within the composition. The types and amounts that may be used of these catalytic materials are well known in the art. The superoxides, including the various acidic peroxides and alcoholic hydroperoxides are particularly exemplary of suitable catalysts that may be employed. Still in other instances materials such as aluminum chloride, boron trifluoride, stannic chloride and azo type catalysts such as azodibutyronitrile may be used.

Also it is contemplated that other art known additives may be employed. These include premature gelation inhibitors, particularly those arresting premature gelation of the reactive resin component. Among such inhibitors which are suitable for this purpose are phenol itself, monoalkyl substituted phenols, and polyhydric phenols such as resorcinol, hydroquinone and the like. The amount of inhibitor is relatively small, ranging from about 0.002% by weight based on the total weight of the polyester resinous composition. Inhibitors of this type may be added to the reactive resin during the preparation thereof or optionally added later to the compounded polyester resinous composition. However, as regards the practice of this invention it is highly desirable to include the phenolic inhibitor within the esterification reaction mixture at least prior to the time that the second step of my novel process is commenced. In this way the extended heating encountered will not cause an appreciable amount of side reactions such as when respective units of the unsaturated polymer unite through addition polymerization. Further, other known additives may be employed such as promoters used in conjunction with the catalyst, mold lubricants, fillers and reinforcement, colorants, flow promoters, ultraviolet absorbing compounds, etc.

Curing of the polyester resinous compositions of this invention does not depart from the practice ordinarily observed in the curing of these type compositions. They may be cured in contact with air or in enclosed molds at temperatures ranging from about 10° C. to about 150° C., or even higher temperatures as long as they are kept below the point the particular resin employed begins to decompose. Where it is convenient, it is especially desirable to form the copolymers by heating the catalyst resin forming mass to between 90° C. and about 120° C. for a period of about 10 to 90 minutes.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE I

*Preparation of Polyester A*

Into a glass flask were charged 546 grams of propylene glycol, 592 parts of phthalic anhydride and 196 parts of maleic anhydride, representing a molar ratio of these ingredients of 6.6/4.0/2.0, respectively. The flask was equipped with a mechanical stirrer, gas inlet tube and a thermometer. Carbon dioxide was introduced into the flask at a rate of about 0.5 liter per minute. The charged components were slowly heated to 160° C. under a steam heat reflux condenser surmounted by a water trap and cooling condenser. When the temperature of 160° C. was obtained the reaction mixture was maintained at this temperature for 16 hours. After the said time the acid number dropped to 49.3 and a total of 99 parts of water had been received. The temperature was then raised to 195° C. and held for 6 hours. The acid number at the end of the holding time at 195° C. was 28.6. A total of 106 parts of water was collected.

*Preparation of Polyester B*

A 550 gram portion of polyester A was charged into a 2 liter, 3-neck flask equipped with a stirrer, gas inlet tube, thermometer and an air condenser equipped with a central cooling finger. The air condenser was connected in series with a Dry Ice trap and water aspirator in that order. To the charged resin was added the basic esterification catalyst tetra isopropyl titanate in the amount of 0.025% by weight based on the resin. To facilitate this addition, the catalyst was added as a 10% solution in propylene glycol. Vacuum was applied to the flask and the pressure adjusted to 150–200 mm. Hg by bleeding carbon dioxide into the flask. The resin charge was slowly heated to 200° C. and held at this temperature for 6 hours. During the course of heating, there was observed to be some build- up of white solid occurring in the flask neck to which the air condenser was attached. The accumulation of solids in the flask neck did not, however, interfere with the esterification process. After the completion of the 6 hours holding time it was determined that the loss of phthalic anhydride, represented mainly by the accumulation of the anhydride within the flask neck, amounted to less than 4% of the phthalic existing in the charged resin.

Polyesters A and B were observed to have softening points of 51° C. and 74° C., respectively, as determined by the Dennis Melting Point Bar method. While it is not indicated hereinabove, a composition corresponding identically to polyester A had been previously processed, such as polyester A was, until the acid number had dropped to 5. It was found that the polyester had increased in softening point only 2° above that observed for the product when it exhibited an acid number in the range of 25–30.

Polyesters A and B were each blended with styrene to yield polyester styrene blends of 70/30 and 60/40, respectively. Each of these blends was catalyzed with 1% of an equi-part mixture of benzoyl peroxide and tri cresyl phosphate. One-eight and ¼ inch castings were made from the two blends by molding same in glass cells of the desired thickness. Mechanical properties were ascertained for the castings in accordance with conventional tests. The data obtained in these tests are shown in the following Table I. It is to be noted from a consideration of these data, the substantial improvements to be obtained in the use of reactive resins prepared in accordance with this invention compare with similar standard-processed resins. The improvement to be obtained in the practice of my invention particularly as related to tensile, elongation and flexural strength at 80° C. are noteworthy. Additionally, it is to be noted that the heat distortion temperature observed for the cured polyester resinous composition prepared from the high molecular weight polyesters of this invention is significantly superior to that exhibited by prior art compositions.

TABLE I

| Alkyd Component | Alkyd/ Styrene Ratio | Tensile Strength, p.s.i.[1] | Percent Elong. | Flex. Strength, p.s.i.[1] | | | Heat Distortion, ° C. |
|---|---|---|---|---|---|---|---|
| | | | | 25° C. | 60° C. | 80° C. | |
| Polyester A | 70/30 | 10,600 | 3.1 | 11,800 | 17,400 | 8,300 | 84 |
| Do | 60/40 | 9,100 | 2.7 | 12,100 | 16,200 | 9,900 | 86 |
| Polyester B | 70/30 | 7,900 | 2.3 | 9,200 | 10,500 | 2,600 | 65 |
| Do | 60/40 | 6,900 | 1.8 | 15,000 | 12,000 | 4,500 | 69 |

[1] By Instron, CHS of 1"/minute.

EXAMPLE II

*Preparation of Polyester C*

Into a suitable reaction vessel equipped with a mechanical stirrer, gas inlet tube and thermometer were charged 1003 parts propylene glycol, 696 parts fumaric acid and 88 parts phthalic anhydride. The charged ingredients were slowly heated to 160° C. with stirring and under an inert atmosphere of carbon dioxide. Reaction was carried out under the stated conditions for approximately 3½ hours whereupon the temperature was quickly raised to 190° C. and reaction continued for an additional 7 hours. The acid number of the completed product was 23.6 and its softening point was determined to be 53° C. Upon cooling the product to room temperature 0.01% hydroquinone was added based on a resin yield of 2227 parts.

*Preparation of Polyester D*

A 500 gram portion of polyester C was charged into a 2 liter, 3-neck flask equipped with a stirrer, gas inlet tube, thermometer and an air condenser equipped with a central cooling finger. The air condenser was connected in series with a Dry Ice trap and water aspirator in that order. To the charged resin was added 0.1% sodium methylate based on the resin. The resin was heated to 195° C. and held at this temperature for 10 hours. Upon reaching the elevated reaction temperature indicated, vacuum was applied to the flask. A pressure in the range of 175-225 m. Hg was maintained during the heating period. The acid number of the completed resin was 2.5. The softening point (Dennis Melting Bar method) of the completed resin was 72° C.

*Preparation of Polyester E*

Into a resin reaction vessel similarly equipped as that employed to prepare the polyester described directly above were charged 550 parts of polyester C. To this charge was added 0.05% of tetra isopropyl titanate and the resin heated to 195° C. Upon reaching this temperature, vacuum was applied and a pressure within the range of 175-225 mm. Hg was maintained during the heating cycle approximating 11 hours. Following the completion of this holding time the acid number of the resin had dropped to 44 and its softening point had increased to 69° C.

Polyesters C, D and E were each blended with methylstyrene to yield resinous compositions containing 70% polyester resin and 30% of the methylstyrene cross-linking agent. Each composition was catalyzed with 1% methyl ethyl ketone peroxide.

A laminate was prepared from each of the polyester resinous compositions employing two plies of 181-136 type cloth corresponding to the specification MMIL-F-9084 as the reinforcing element. The procedure involved in preparing the laminates consisted of laying one piece of cloth upon a sheet of cellophane serving as a temporary backing sheet or cover during the subsequent molding operation. Onto the glass cloth was poured the catalyzed polyester resinous composition in such an amount so as to provide a cloth to resin ratio of approximately 65:35, respectively. The resinous composition was then suitably spread out over the entire surface of the cloth. Thereupon, another sheet of the glass fabric was placed upon the initially impregnated piece so that all plies were parallel. The impregnation of a second sheet was then accomplished employing the identical manner used to treat the first cloth layer. A cover of cellophane was then layed over the lay-up and a caul plate was placed on top. The resinous composition was allowed to soak into the fabric for 15 minutes, so that the glass fabric was thoroughly impregnated. After the soaking period, the top plate was removed and excess resin and trapped air were worked out by wiping the exposed cellophane surface with a rigid flat piece of plastic. The laminate assembly was then placed between caul plates in a hydraulic press equipped with steam-heated platens. The pressure applied during the curing cycle was approximately 15 p.s.i. The temperature of the caul plates was raised from room temperature to 210° F. to 220° F. in 30 minutes and the laminate was further subjected to these conditions for 1 hour, following which cure cycle the laminate was cooled to room temperature.

It was found that the laminates derived from compositions containing either polyester D or E were comparable in properties as tensile strength, flexural strength and heat distortion and in these regards showed considerable improvement over the laminate prepared from the composition containing the polyester resin prepared in accordance with prior art practice, namely, polyester C.

Polyester resinous compositions were made from polyester C and polyester E by blending each of said polyesters with styrene on the basis of 70 parts resin to 30 parts monomer. After catalyzing the respective blends with 1% of an equi-part mixture of benzoyl peroxide and tricresyl phosphate, ⅛″ thick castings were prepared therefrom in the manner outlined in Example II. The flexual strength properties noted for the casting prepared in accordance with this invention were markedly superior to those observed for the prior art as can be seen from the data set forth in the following Table II.

TABLE II
[⅛″ castings (polyester/styrene 70/30)]

| Polyester | Flex. Strength p.s.i.[1] | | |
|---|---|---|---|
| | 25° C. | 80° C. | 100° C. |
| C | 12,200 | 8,700 | 2,500 |
| E | 11,500 | 12,300 | 7,400 |

[1] By Instron, GHS of 1″/minute.

I claim:
1. A process for the preparation of an improved, essentially linear polyester resin containing ethylenic unsaturation which comprises: (1) heating a reaction mixture comprising a saturated dihydric alcohol, an α,β-ethylenically unsaturated dicarboxylic acid and from about 10 to 90 mol percent, based on the total mols of polycarboxylic acid present in said reaction mixture, of ortho phthalic acid, at a temperature of from about 160° C. to 225° C. until the softening point of the resulting esterified mixture reaches a substantially maximum value as determined by the Dennis Melting Point Bar method and the acid number of said mixture is within the range of from about 20 to 50, said mixture being free of esterification catalyst, (2) forming a second reaction mixture comprising (a) the esterified mixture of step (1) and (b) from about 0.005% to 0.5% by weight, based on the weight of said esterified mixture, of a basic esterification catalyst, said second reaction mixture being free of cross-linking monomers containing the $CH_2$=C< group, and (3) heating said second reaction mixture at a temperature of from about 150° C. to 210° C. under vacuum until a soluble, fusible product having a softening point at least about 10° C. greater than that of the esterified mixture of step (1) is obtained.

2. A process according to claim 1 wherein the basic esterification catalyst is a tetra alkyl titanate.

3. A process according to claim 1 wherein the basic esterification catalyst is tetra isopropyl titanate.

4. A process according to claim 1 wherein the basic esterification catalyst is a basic alkali metal salt.

5. A process according to claim 1 wherein the basic esterification catalyst is a basic alkaline earth metal salt.

6. A process according to claim 1 wherein the basic esterification catalyst is a basic alkali metal alcoholate.

7. A process according to claim 1 wherein the basic esterification catalyst is sodium methylate.

8. A process for the preparation of an improved, essentially linear polyester resin containing ethylenic unsaturation which comprises: (1) heating a reaction mixture comprising a saturated dihydric alcohol, an α,β-ethylenically unsaturated dicarboxylic acid and from about 25 to 70 mol percent, based on the total mols of polycarboxylic acid present in said reaction mixture, of ortho phthalic acid, at a temperature of from about 160° C. to 225° C. until the softening point of the resulting esterified mixture reaches a substantially maximum value as determined by the Dennis Melting Point Bar method and the acid number of said mixture is within the range of from about 20 to 50, said mixture being free of esterification catalyst, (2) forming a second reaction mixture comprising (a) the esterified mixture of step (1) and (b) from about 0.005% to 0.5% by weight, based on the weight of said esterified mixture, of a basic esterification catalyst, said second reaction mixture being free of cross-linking monomers containing the $CH_2$=C< group, and (3) heating said second reaction mixture at a temperature of from about 180° C. to 210° C. under vacuum until a soluble, fusible product having a softening point at least about 10° C. greater than that of the esterified mixture of step (1) is obtained.

9. A process according to claim 8 wherein the basic esterification catalyst is a tetra alkyl titanate.

10. A process according to claim 8 wherein the basic esterification catalyst is tetra isopropyl titanate.

11. A process according to claim 8 wherein the basic esterification catalyst is a basic alkali metal salt.

12. A process according to claim 8 wherein the basic esterification catalyst is a basic alkaline earth metal salt.

13. A process according to claim 8 wherein the basic esterification catalyst is a basic alkali metal alcoholate.

14. A process according to claim 8 wherein the basic esterification catalyst is sodium methylate.

15. A process for the preparation of an improved, essentially linear polyester resin containing ethylenic unsaturation which comprises: (1) heating a reaction mixture comprising a saturated dihydric alcohol, maleic acid and from about 25 to 70 mol percent, based on the total mols of polycarboxylic acid present in said reaction mixture, of ortho phthalic acid, at a temperature of from about 160° C. to 225° C. until the softening point of the resulting esterified mixture reaches a substantially maximum value as determined by the Dennis Melting Point Bar method and the acid number of said mixture is within the range of from about 20 to 50, said mixture being free of esterification catalyst, (2) forming a second reaction mixture comprising (a) the esterified mixture of step (1) and (b) from about 0.005% to 0.5% by weight, based on the weight of said esterified mixture, of a basic esterification catalyst, said second reaction mixture being free of cross-linking monomers containing the $CH_2=C<$ group, and (3) heating said second reaction mixture at a temperature of from about 180° C. to 210° C. under vacuum until a soluble, fusible product having a softening point at least about 10° C. greater than that of the esterified mixture of step (1) is obtained.

16. A process according to claim 15 wherein the basic esterification catalyst is a tetra alkyl titanate.

17. A process according to claim 15 wherein the basic esterification catalyst is tetra isopropyl titanate.

18. A process according to claim 15 wherein the basic esterification catalyst is a basic alkali metal alcoholate.

19. A process according to claim 15 wherein the basic esterification catalyst is sodium methylate.

References Cited in the file of this patent

UNITED STATES PATENTS

| | | |
|---|---|---|
| 2,443,741 | Kropa | June 22, 1948 |
| 2,562,878 | Blair | Aug. 7, 1951 |

FOREIGN PATENTS

| | | |
|---|---|---|
| 548,082 | Belgium | Nov. 24, 1956 |